US011836977B2

(12) United States Patent
Srikanth et al.

(10) Patent No.: US 11,836,977 B2
(45) Date of Patent: Dec. 5, 2023

(54) SYSTEM AND METHOD FOR HYBRID VISUAL SEARCHES AND AUGMENTED REALITY

(71) Applicant: W.W. Grainger, Inc., Lake Forest, IL (US)

(72) Inventors: Ojasve Srikanth, Lake Forest, IL (US); Fouad Bousetouane, Vernon Hills, IL (US); Nirav Saraiya, Lake Forest, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 429 days.

(21) Appl. No.: 17/113,377

(22) Filed: Dec. 7, 2020

(65) Prior Publication Data

US 2021/0174087 A1 Jun. 10, 2021

Related U.S. Application Data

(60) Provisional application No. 62/944,055, filed on Dec. 5, 2019.

(51) Int. Cl.
*G06V 20/20* (2022.01)
*G06T 19/00* (2011.01)
*G06Q 30/0601* (2023.01)

(52) U.S. Cl.
CPC ......... *G06V 20/20* (2022.01); *G06Q 30/0643* (2013.01); *G06T 19/006* (2013.01)

(58) Field of Classification Search
USPC ........................................... 382/141
See application file for complete search history.

(56) References Cited

U.S. PATENT DOCUMENTS

| | | | | |
|---|---|---|---|---|
| 7,389,252 | B2* | 6/2008 | Robb | F21V 29/773 |
| | | | | 705/26.62 |
| 10,475,099 | B1* | 11/2019 | Nomula | G06T 19/20 |
| 10,970,867 | B2* | 4/2021 | Anadure | G06T 7/60 |
| 2016/0225056 | A1* | 8/2016 | Pellow | G06Q 30/0643 |
| 2017/0364994 | A1* | 12/2017 | Parker | G06Q 30/0625 |

* cited by examiner

*Primary Examiner* — Gabriel I Garcia
(74) *Attorney, Agent, or Firm* — GREENBERG TRAURIG, LLP

(57) ABSTRACT

A search processing system receives a search query having information indicative of an object of interest, such as an image. The search processing system uses the received search query to locate data for use in creating a computer-generated model of a product determined to be a match for the object of interest. A display generating device uses the data to create the computer-generated model of the product and causes the computer-generated model of the product to be displayed a display associated with the display generating device and/or to be projected onto a surface whereby the computer-generated model of the product can be accurately compared with an image of the object of interest or the object of interest itself.

11 Claims, 6 Drawing Sheets

SYSTEM AND METHOD FOR HYBRID VISUAL SEARCHES AND AUGMENTED REALITY

RELATED APPLICATION INFORMATION

This application claims the benefit of U.S. Provisional Application No. 62/944,055, filed on Dec. 5, 2019, the disclosure of which is incorporated herein by reference in its entirety.

BACKGROUND

In various environments or contexts, customers in need of a product oftentimes resort to electronic catalog searches to find information regarding the product. Such searches are typically performed by use of a search engine. To locate a product of a particular type, a customer typically provides product information to the search engine via the use of keywords, drill down menu selections, images, etc. However, absent the ability to further ascertain or gauge the extent of product matches located by a product search in terms of exact sizes/dimensions, the shopping experience of the customer can be burdensome, ineffective, and/or inefficient.

SUMMARY

To address the problems in the current state of the art, the following generally describes systems and methods that combine the capabilities of search and augmented reality to provide a hybrid shopping experience to customers. By of example, a product is located by providing input to a search engine and a computing platform (e.g., a mobile phone of a customer) is used to display onto a real-world image that is being captured by a camera of the computing platform a computer-generated, size accurate 3D model of the located product. In this manner, the customer can compare the computer-generated 3D model of the located product with an actual product of interest as the actual product of interest is being captured by the camera of the computing platform to ensure, among other things, that the located product is size accurate with the product of interest. Likewise, the computer-generated 3D module of the located product may be "test fitted" with an actual complimentary product (e.g., a nut used with a bolt) to ensure that the located is size accurate. Accordingly, it will be appreciated that the approaches disclosed hereinafter have, among other advantages, the advantage of simplifying product purchasing tasks, particularly when such tasks involve a search for products, such as fasteners, having a size requirement.

BRIEF DESCRIPTION OF THE DRAWINGS

Various examples of systems and methods for combining search results with augmented reality will be described with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative examples.

DETAILED DESCRIPTION

Figure 1:
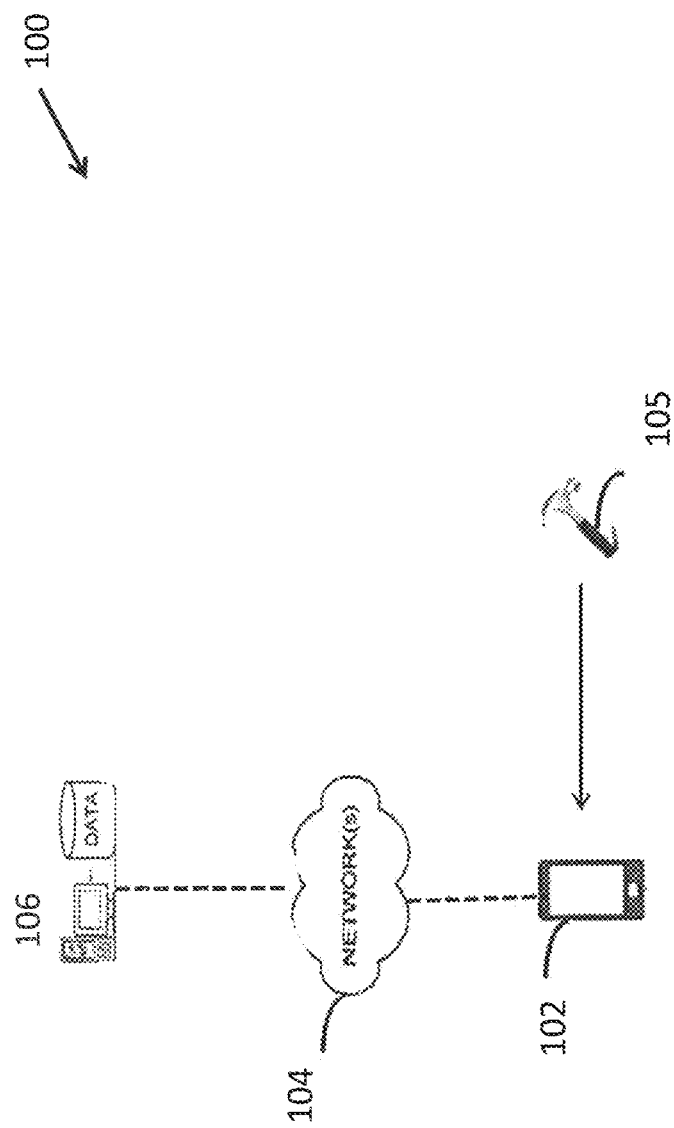
FIG. 1 is a simplified block diagram of an example computing environment in which illustrative examples may be implemented for hybrid visual searches and augmented reality, in accordance with one or more examples of the present disclosure.

Various examples of systems and methods for combining search results with augmented reality will now be described. It is to be understood that the described examples are merely illustrative and, as such, are not intended to limit the scope of the claims that are appended hereto.

Throughout the specification, the following terms take their meanings explicitly associated herein, unless the context clearly dictates otherwise. The phrases "in one example" and "in some examples" as used herein do not necessarily refer to the same example(s), though it may. Furthermore, the phrases "in another example" and "in some other examples" as used herein do not necessarily refer to a different example, although it may. Thus, as described below, various examples may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, augmented reality refers to content including a mix of both real-life audio, visual, video, as well as computer generated audio, visual, video, tactile, and/or other sensory or contextual content such as graphic, mask, animation, etc.

While the systems and methods described herein are particularly useful to provide a unique shopping experience to customers in a B2B (business-to-business) environment, for example, customers interacting with a MRO (Maintenance, Repair and Operation) supplier, it will be understood that the concepts described herein would be equally useful in a C2B (customer-to-business) environment. In addition, while described as being implemented on a mobile device, such as a phone, tablet computing device, or the like, it will be understood that the concepts described herein could be implanted on other devices having an associated display and an associated camera, such as smart glasses.

As will be better appreciated from the descriptions that follow, the systems and methods described herein will, among other things, function to ensure the accuracy of product selection when the user is particularly concerned with the sizes of parts, including for instance, fasteners and small products. To this end, the system will allow a customer (e.g., a user) to snap a picture/image of an unknown item for the purpose of obtaining a product search result. The product search result is obtained by providing the image to a cloud-based, machine learning visual search engine, The visual search engine will use the image to identify the likely product from a catalogue (e.g., the "Grainger" catalogue) and will return the search results to a hand-held computing device, such as a phone of the user. A process or processes executed on the phone may then be used to combine the search result (particularly a size accurate 3-D modeled image of a product) and a real-time image captured by a camera associated with the phone (e.g., an image of the product itself or a complimentary product) to provide the user with an augmented reality experience in which there is a greater chance of ensuring that the product located via use of the search is exactly what the user was looking for. Importantly for the user, this can be accomplished prior to the user having to buy the product and thereafter try the product to see if the product is size correct.

As described above, during a product identification phase of the hybrid experience, the user seeks to identify a product by providing an image of the product, taken by or uploaded from a handheld device (e.g., a smartphone, tablet, etc.), to a visual search engine. In the subject example, the visual search engine will process the captured image to extract certain features of the imaged product and will then compare the extracted features of the imaged product with features that are associated with each of a plurality of catalog products, e.g., features associated with various stock-keeping unit (SKU) items sold by a vendor as stored in an e-catalog database. The catalog product located by the visual search engine in the performance of this process is then returned to a user as the search result. If multiple possible matches are located for the imaged product by the visual search engine, the search result including the plural possible matches may be provided to the user and the user may interact with the search results to select a one of the possible matching catalog products as being the catalog product of interest. The catalog product of interest may then be used in the augmented reality phase of the hybrid experience described below.

While described in the context of a visual search, it will be appreciated that keyword, drill down, and other search techniques can be used alternatively or in conjunction with visual search techniques to identify a catalog of interest.

During the augmented reality phase of the hybrid experience, augmented reality content (e.g., a 3D model) of the catalog product of interest can be projected on a plane in real time next to a physical object. First, the handheld device (e.g., the smartphone) is calibrated to its local environment. In order to find a suitable horizontal display surface plane and points clouds detection is also performed. Then, the augmented reality content (e.g., the 3D model object) is displayed as an overlay, i.e., as a virtual object, in the real world, which includes a real object. At this point, the virtual object and real object are displayed true to life and therefore accurate size comparisons can be made. Moreover, measurements of the objects can also be performed, and sizes can be used to search for an exact product.

Tuning now to FIG. 1, FIG. 1 illustrates a simplified diagram of an example computing environment usable to provide hybrid visual searches and augmented reality according to an example of the present disclosure. As shown in FIG. 1, a processing device 102 (having one or more processors and an associated memory storing instructions executable by the processor(s) wherein the instructions, when executed by the processor(s), cause the processing device 102 to perform various actions) is configured to communicate, using appropriate communication hardware, with a server 106, preferably implemented as a collection of servers in a cloud network environment, via a network 104. The network 104 may be any type of communication network such as, for example, LAN, WAN, the Internet, Wi-Fi, cellular network, GPS, near field communication network, and the like. In some examples, the server 106 (which likewise has one or more processors and an associated memory storing instructions executable by the processor(s) wherein the instructions, when executed by the processor(s), cause the server 106 to perform various actions) is configured to perform visual searches, return search results to the processing device 102, as well as provide storage and/or delivery of augmented reality content and/or information/data related to the augmented reality content to an augmented reality processing application installed on processing device 102. In some other examples, the hybrid system of visual searches and augmented reality may be implemented at the processing device 102, independent from the server 106. In other examples, the hybrid system of visual searches and augmented reality may be implemented partially at the processing device 102 in conjunction with the server 106. Ultimately, a user may operate the processing device 102 to, for example, obtain a query image (e.g., an image of a physical product 105, an image of a previously captured image of a physical product), provide the query image to the visual search engine functionality that is provided by the server 106, to retrieve/receive search results from the server 106 based on the query image, to view augmented reality content generated based on the search result, and to interact with such augmented reality content. In addition, when the user has discerned that the search result includes a product that the user desires to purchase, the user may use otherwise conventional e-commerce functionality provided by the processing device 102 (typically in connection with an e-commerce server) to purchase and arrange for the delivery/pickup of the product.

The processing device 102 may be any electronic device or electronic devices configured with augmented reality capabilities. For example, the processing device 102 can include, a mobile phone, tablet computing device, a smart watch, an IoT device, an in-vehicle device, a wearable device, and the like. In some examples, the processing device 102 is provided with execution instructions to, for example, provide for a customer, e.g., a user, to interact with the augmented reality content. In some examples, the processing device 102 may also be configured to capture an input image for searches, receive an input image for searches, receive input keywords for searches, transmit an input image and/or other search inputs to the server 106, receive one or more search results returned by the server 106, as well as receive one or more augmented reality content and/or augmented content related data returned by the server 106.

Figure 2:
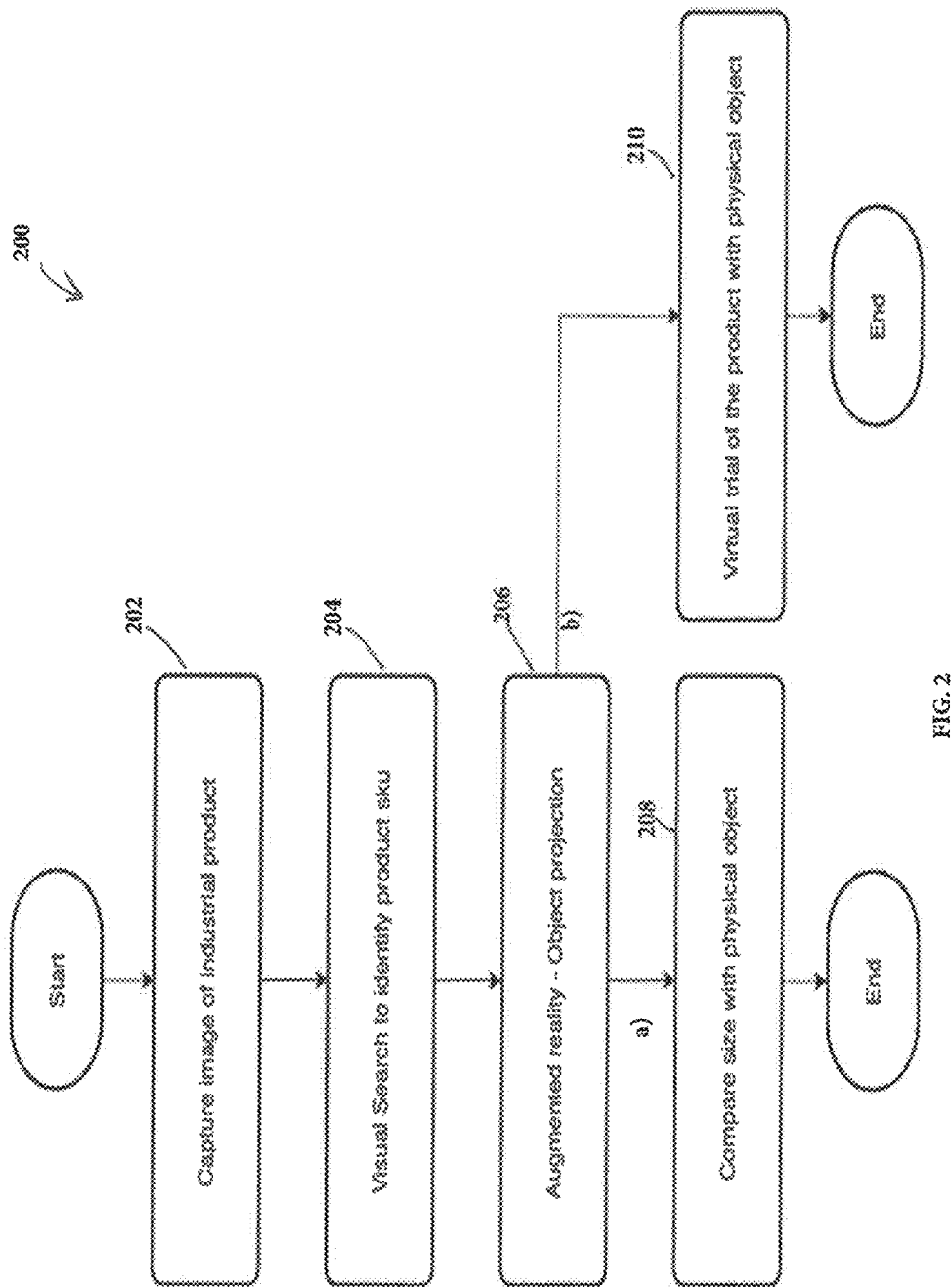
FIG. 2 is a simplified flowchart diagram of an example process for hybrid visual searches and augmented reality, in accordance with one or more examples of the present disclosure.

FIG. 2 illustrates a simplified flowchart diagram of an example process for providing hybrid visual searches and augmented reality in accordance with an example of the present disclosure. The process 200 may be implemented (in whole or in part) by the processing device 102 of FIG. 1, the processing device 301 of FIG. 3, a mobile device 502 of FIGS. 5A-E, a computer system 600 of FIG. 6, and the like without limitation. For clarity and simplicity of description, the following is described with reference to the processing device 102. Furthermore, the process 200 may be performed at the processing device 102 either independent from a server (e.g., the server 106 of FIG. 1) or in conjunction with a server (e.g., the server 106 of FIG. 1).

The process 200 starts at a block 202, where an image of a product of interest (e.g., a searched-for product) is captured to generate a query image. In some examples, the product of interest is an industrial product. The query image may include only the product of interest as a visual object. The query image may also be a composite image, including not only the product of interest as a visual object, but also other products as other visual objects. In some examples, the image is captured by use of a camera of the processing device 102.

At a block 204, a visual search is performed to identify the product of interest based on the query image. For example, in the context of the MRO industry, a product of interest can be identified using its unique SKU. As such, the visual search may be configured to return at least one SKU corresponding to products potentially matching the product of interest presented in the query image. In the scenarios where the query image includes multiple visual objects, the visual search may be configured to allow for selection of a visual object representing a product before proceeding with the search based on the query image.

At a block 206, augmented reality content is generated based on the results returned by the visual search. For example, a computer-generated three-dimensional (3D) model object—which is cross-referenced in a database to the SKU located as a result of the performance of the visual search—can be provided as the augmented reality content. From this point on, the user of the processing device 102 may choose to proceed in the searching experience with various operations. In some examples, one or both of the following operations are provided to the user. Following path a) of FIG. 2, the user may elect to use the augmented reality content (e.g., 3D object generated based on the returned SKU information) to make comparison with a physical object (e.g., the product of interest which the query image is captured against) in terms of sizes/dimensions, at a block 208. Equipped with the comparison knowledge, the user is enabled to ascertain whether the sizes/dimensions of the 3D model object and the product of interest are the same, or to which degree they are similar.

On the other hand, following path b) of FIG. 2 from the block 206, the user may elect to use the augmented reality content to perform a virtual trial of the augmented reality content (3D object) with a physical object, at a block 210. In some examples, such virtual trial may be performed by projection of the computer-generated 3D object onto a physical object such that the user can estimate or ascertain whether the product identified by the returned SKU is the product of interest.

Figure 3:
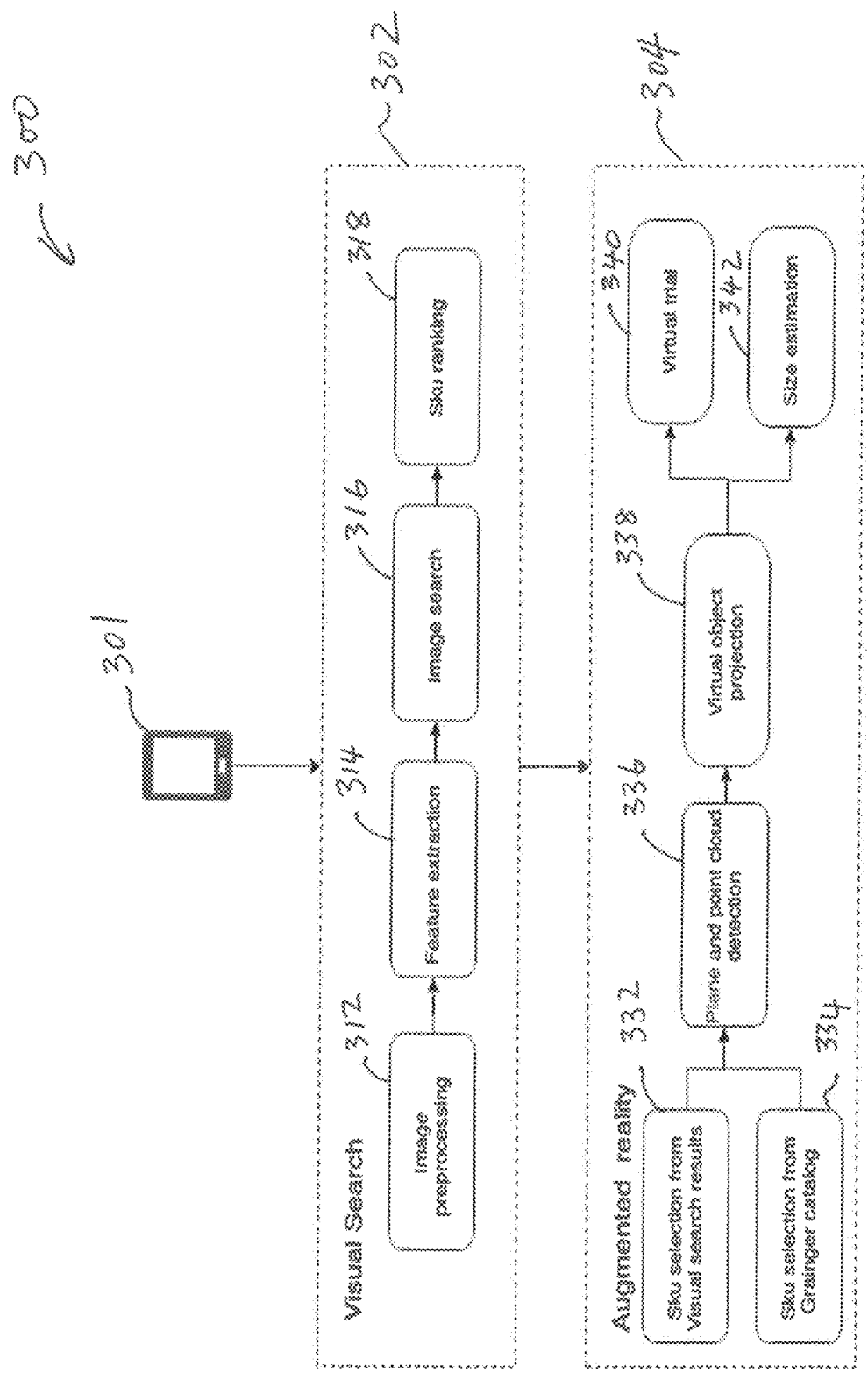
FIG. 3 is a simplified flowchart diagram of another example process for hybrid visual searches and augmented reality, in accordance with one or more examples of the present disclosure.

Now referring to FIG. 3, a simplified flowchart of another example process for providing hybrid visual searches and augmented reality is illustrated in accordance with an example of the present disclosure. While illustrated with the process 300 being performed by the processing device 301, it will be understood that the process can be performed (in whole or in part) by the processing device 102 of FIG. 1, the mobile device 502 of FIGS. 5A-E, the computing system 600 of FIG. 6, and the like. Furthermore, the process 300 may be performed at the processing device 301 either independent from a server (e.g., the server 106 of FIG. 1) or in conjunction with a server (e.g., the server 106 of FIG. 1).

The process 300 starts with block 302, where a visual search is performed using a query image. In this example, the visual search is conducted via a series of steps (blocks 312 through 318). At a block 312, the query image is pre-processed to prepare the query image for the subsequent visual search. In this stage, various pre-processing techniques, such as cropping, masking, adjusting, normalizing, extracting, resizing, and/or reformatting, may be deployed to prepare and/or improve the quality the query image.

At block 314, features of the pre-processed query image are extracted to obtain visual information associated with the image. Such features may be associated with, for example and without limitations, color, texture, shape, spatial distribution of objects, and the like. Any visual/data analysis tool, techniques, and/or algorithms may be utilized to extract, derive, learn, or otherwise obtain visual features from the pre-processed query image. In implementations, scale-invariant feature transformation (SIFT), multi-layer rotation invariant EOH, histogram of gradient (HoG), and the like may be utilized to extract features from the pre-processed query image.

At block 316, a visual search (e.g., an image search) is performed using the extracted image features. In some examples, the visual search is performed by the processing device 301 transmitting the query image or the extracted image features to a server (such as the server 106 of FIG. 1) for processing. The server may be implemented with access to one or more databases that are configured to store image information against which the visual search is operated. In the context of the MRO industry, for example, the databases may be configured to include product image information for all the product in the product catalogue(s) which the image information being indexed with their respective SKUs. Upon the conclusion of the visual search, one or more products that potentially match with the product represented in the query image can be identified. Subsequently, information about the one or more result products may be retrieved for subsequent provision to the user At block 318, when a plurality of potential matching products is identified by the visual search, these potential matches are ranked according to various criteria. For example, a search engine residing at the server 106 and/or the processing device 301 may be configured to train its ranking capability via training data such as sets of training query images, as well as relevance information provided in the feedback from previous user search/shopping experience. As such, a ranked list of identifying information (e.g., a ranked lists of SKUs) associated with the plurality of potentially matching products is returned as the result of the visual search.

At this point, with the ranked list of SKUs returned from the visual search, the process 300 proceeds to block 304 to commence the augmented realty phase of the user search/shopping experience. In some examples, the list of ranked SKUs is presented to the user via a graphical user interface at a display of the processing device 301. The user is enabled to interact with the graphical user interface to select a search result (e.g., a SKU) from the list of ranked search results (e.g., the list of ranked SKUs), at a block 332. For example, the user may click on the SKU of interest with a finger on a touch screen display of the processing device 301, or with a stylus/mouse on the display of the processing device 301, to select the SKU of interest.

It should be appreciated that, although in this example the list of ranked SKUs is returned from performance of the visual search, one or more SKUs of interest may nevertheless be retrieved from sources other than the results returned by a visual search. For instances, the user may enter a SKU as a free form search query after consulting a MRO product catalogue (e.g., on-line or in print), at block 334.

Next, at block 336, augmented reality capabilities are invoked based at least in part on the selected SKU. For example, plane and point clouds detection may be performed to generate a 3D object according to the information that is cross-reference to the selected SKU.

Subsequently at block 338, augmented reality capabilities are further utilized to present to the user the generated 3D object using the detected plane and point clouds. In some examples, the 3D object is presented to the user in the form of augmented reality content. For instances, the augmented reality content may be projected as an overlay onto or next to an image of the searched-for product, or onto a physical object in the real word.

At this point, the user is presented with various options in terms of how to leverage the augmented reality content to better confirm or refine the search. In some examples, the user is enabled to interact with the augmented reality content to conduct a virtual trial of the 3D object (block 340). For example, such a virtual trial may be conducted in the context where the searched-for product is to be deployed in connection with other products. In some other examples, the user is enabled to interact with the augmented reality content to estimate, gauge, and/or ascertain the extent of match in terms of the dimensions/sizes of the 3D object of the product identified by selected SKU (block 342), in comparison with the searched-for product (e.g., the product depicted in the query image).

Figure 4:
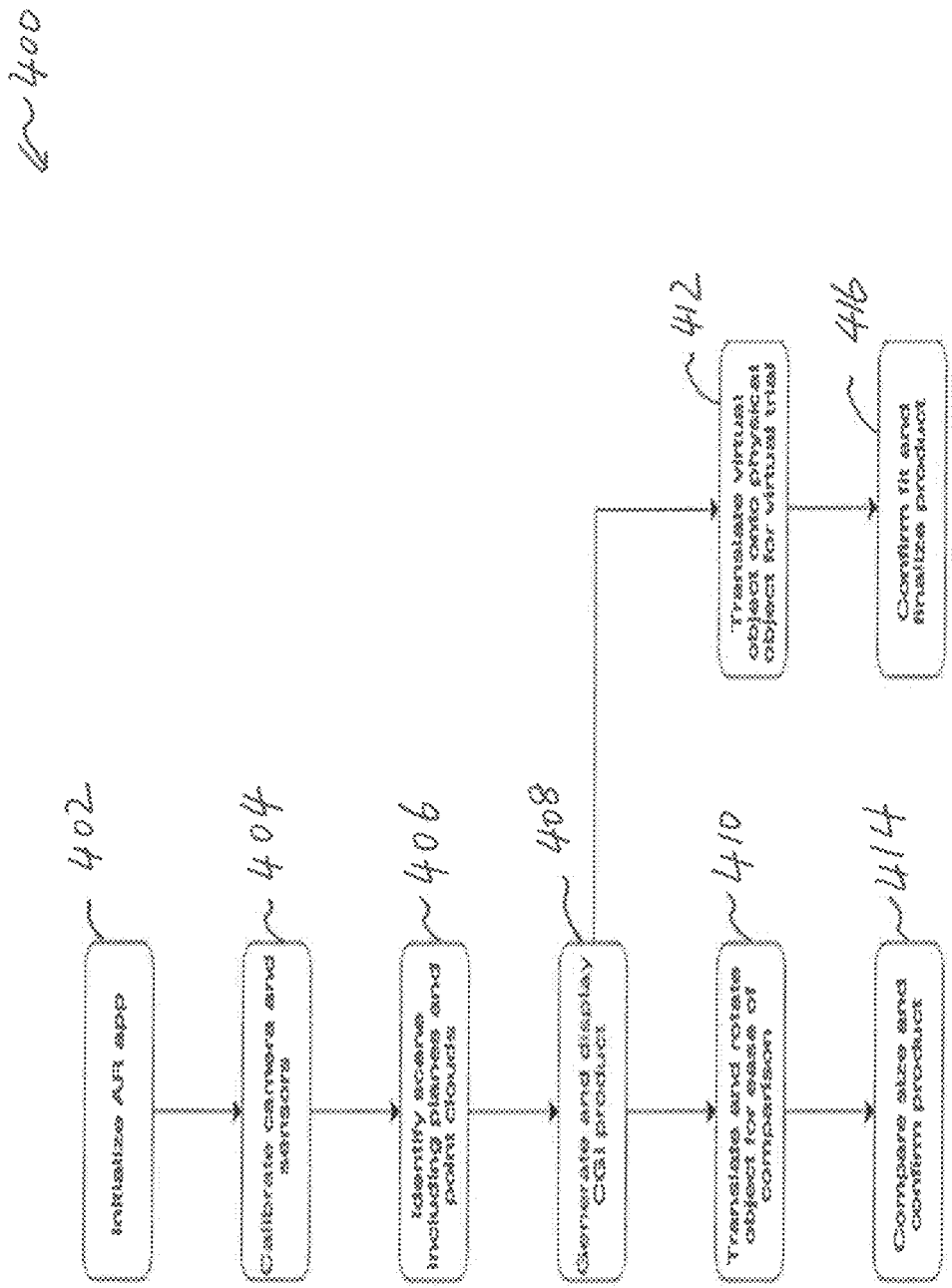
FIG. 4 is a simplified flowchart diagram of an example process for supplementing visual searches with augmented reality, in accordance with one or more examples of the present disclosure.

FIG. 4 is a simplified flowchart for an example process for supplementing visual searches with augmented reality in accordance with an example of the present disclosure. Process 400 may be performed by, for example and without limitation, the processing device 102 of FIG. 1, the processing device 301 of FIG. 3, the mobile device 502 of FIGS. 5A-E, the computing system 600 of FIG. 6, and the like. For clarity and simplicity of description, the following is illustrated with reference to the processing device 102, in a non-limiting manner. Furthermore, the process 400 may performed at the processing device 102 either independent from a server (e.g., the server 106 of FIG. 1) or in conjunction with a server (e.g., the server 106 of FIG. 1).

The process 400 starts at block 402, where augmented reality (AR) functionalities are invoked. In this example, the AR functionalities are provided upon the user's indication/instruction. For example, the user may indicate a desire to start the process by clicking on a "Project 3D model" button (e.g., a button 526 of FIGS. 5A-E, the detail of which is described with connection to FIGS. 5A-E below). In some examples, the AR functionalities may be invoked by launching or executing an AR app on the processing device 102 or its peripherals. Alternatively, the AR functionalities may be invoked by activating the search app (e.g., a search app implementing the process 200, the process 300, and/or the process 400) running on the processing device 102 an entering the search app into an AR mode (e.g., from a previous visual search mode), which may be enabled at the processing device 102 and/or its peripherals.

Next at block 404, devices and components associated with the processing device 201 and/or its peripherals are calibrated for the purpose of providing AR content. In some examples, a camera and/or various sensors (e.g., depth sensor) resident on the processing device 102 and/or its peripherals can be calibrated to capture a picture of, for example, a physical product of interest. In other examples, particularly when the user is consulting a catalogue for entering a SKU to cue off a visual search that is performed prior to the process 400, the camera and sensors can be calibrated to capture a picture of a product image displayed in the catalogue.

Next at block 406, scenes including planes and point clouds are identified; and at a block 408, a virtual model (e.g., a CGI model) of the product for projection is generated and displayed to the user as the augmented reality content. In some examples, the augmented reality content is displayed as an overlay onto the image of a physical product. In one example, the augmented reality content (e.g., a 3D model) may be overlaid in a manner that it can be translated and rotated such that the user may interact with the augmented reality content for the ease of comparing the 3D model to the image of the physical product (block 410). As a result, the user is enabled to compare the sizes/dimensions to confirm whether the product represented by the 3D model matches the searched-for product in the image.

Alternatively, or additionally, the augmented reality content may be translated onto one or more physical objects for a virtual trial of the 3D model, at block 412. As a result, the user is enabled to gauge, and/or confirm whether or to what extent the product represented by the 3D model fits with those one or more physical objects. For example, the image onto which the augmented reality content is overlaid includes an image of a bolt of a certain size, and a 3D model of an identified bolt can be projected onto the image of the bolt so that to assist the user to estimate whether these two have the matching size relative to each other. At block 416, equipped with the results from the virtual trial, the user is able to confirm the desired fit prior to deciding whether or not to purchase the product.

FIGS. 5A-E are a series of simplified graphical user interface (GUIs) on a display of a mobile device illustrating an example interactive user experience using hybrid visual searches and augmented reality, in accordance with the present disclosure. As shown herein, a graphical user interface 504 is presented on a display of a mobile device 502. The mobile device 502 may be implemented by the processing device 102 of FIG. 1, the processing device 301 of FIG. 3, the computing system 600 of FIG. 6, and the like.

Figure 5:
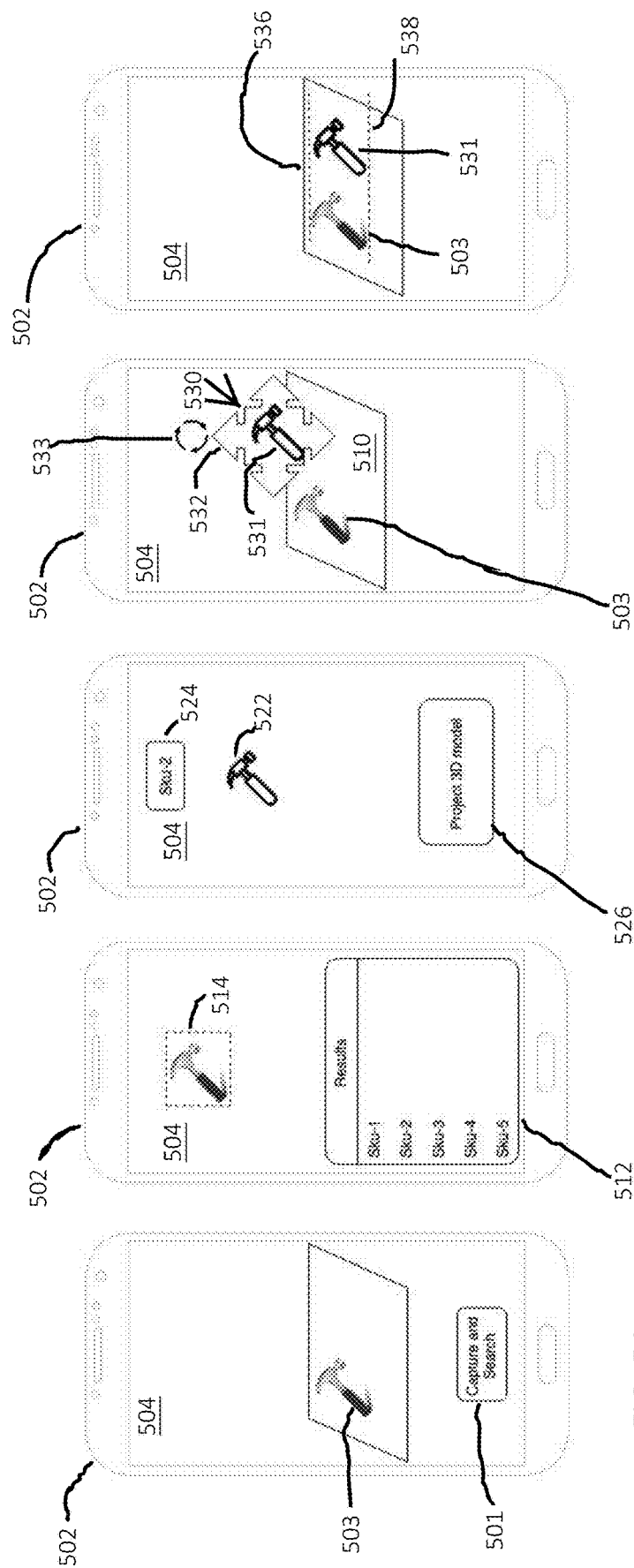
FIGS. 5A-E are a series of simplified graphical user interface (GUIs) on a display of a processing device illustrating an example interactive user experience using hybrid visual and augmented reality, in accordance with one or more examples of the present disclosure.

In the example illustrated in FIG. 5A, the GUI 504 is configured with a user interface element 501 by which the user is enabled to commence the process of capturing an image 503 of a product (e.g., a claw hammer) using a camera (not shown) of the mobile device 502 and requesting a visual search based on the captured image. The user interface element 501 may be configured as a button, or any operable user interface element as desired. As shown herein, the image 503 of the product (e.g., searched-for product) is displayed in an image plane 510, toward the left-hand side thereof.

After initiating the visual search by clicking the user interface element 501, the next screen, which is illustrated in FIG. 5B is presented to the user. At this point and as shown in the figure, the GUI 504 is configured to display an image 514 of the product (e.g., an image cropped properly from the image 503, a retrieved thumbnail of the product, or the like) towards the upper region of the screen. Further, towards the lower region, the GUI 504 is configured to display all or a portion of the results returned from the visual search obtained by use of the image 514. For instance, the GUI 504 may be configured to deploy a scrollable dropdown list having the elements to be presented to the user at the mobile device 502. In some instances, only a singular search result may be returned and presented as the element 512. Moreover, the user may operate the element 512 to browse the search results (when multiple results are returned), and/or to select one result to proceed to the next screen.

In the illustrated example, the user operates the GUI element 512 to select the search result labeled as "Sku-2," thereby causing the system to display the screen as shown in FIG. 5C. In the example screen illustrated in FIG. 5C the GUI 504 is configured to display an indicator (e.g., an icon, a text box, etc) towards the top region of the display to show the user that "Sku-2" was selected. Towards the middle region, the GUI 504 is configured to display an image 522 of the product identified by Sku-2. Toward the lower region, the GUI 504 is configured to display an operable interface element 526, by which the user is enabled to request a projection of a 3D model that corresponds to the image 522. As shown herein, the element 526 may be a clickable button.

Upon the user operating the element 526, the system will navigate to the screen as shown in FIG. 5D. In this illustrated example, the augmented content 530 is displayed as an overlay at an initial location in the vicinity of the image 503. In this example, the augmented content 530 is overlaid onto the plane 510 in a partially overlapping manner by obscuring an upper right portion of the plane 510. In some examples, the augmented content 530 may comprise a 3D model 531 of the identified product. The augmented content 530 may further comprise a widget/interactive user element(s) 532, which allows the user to interact with the augmented content. As shown herein, the widget 532 is configured as a four-way arrow control. Further, an icon 533 (e.g., a group of circular arrows) that presents an operational tip to the user may be displayed proximate to the widget 532 to signal to the user how to interact with the widget 532. In this example, the element 532 may be rotated clock-wise or counter clock-wise to position the 3D model 531 side to side with the image 503. It should be appreciated that any forms of interface elements may be deployed to assist the user in interacting with or otherwise manipulating the augmented content.

Once the user is done positioning the 3D model 531 at a suitable location relative to the location of the image 503 on the plane 510, the GUI 504 is navigated to a screen as shown in FIG. 5E. At this point, both the image 503 and the 3D model 531 are displayed in the context of the plane 510. As indicated with dotted lines 536 and 538, both visual objects are aligned side-by-side and scaled properly for further analysis. In some examples, the user is enabled to estimate and decide whether and/or to what extent these two objects represents the same products in terms of sizes/dimensions.

Figure 6:
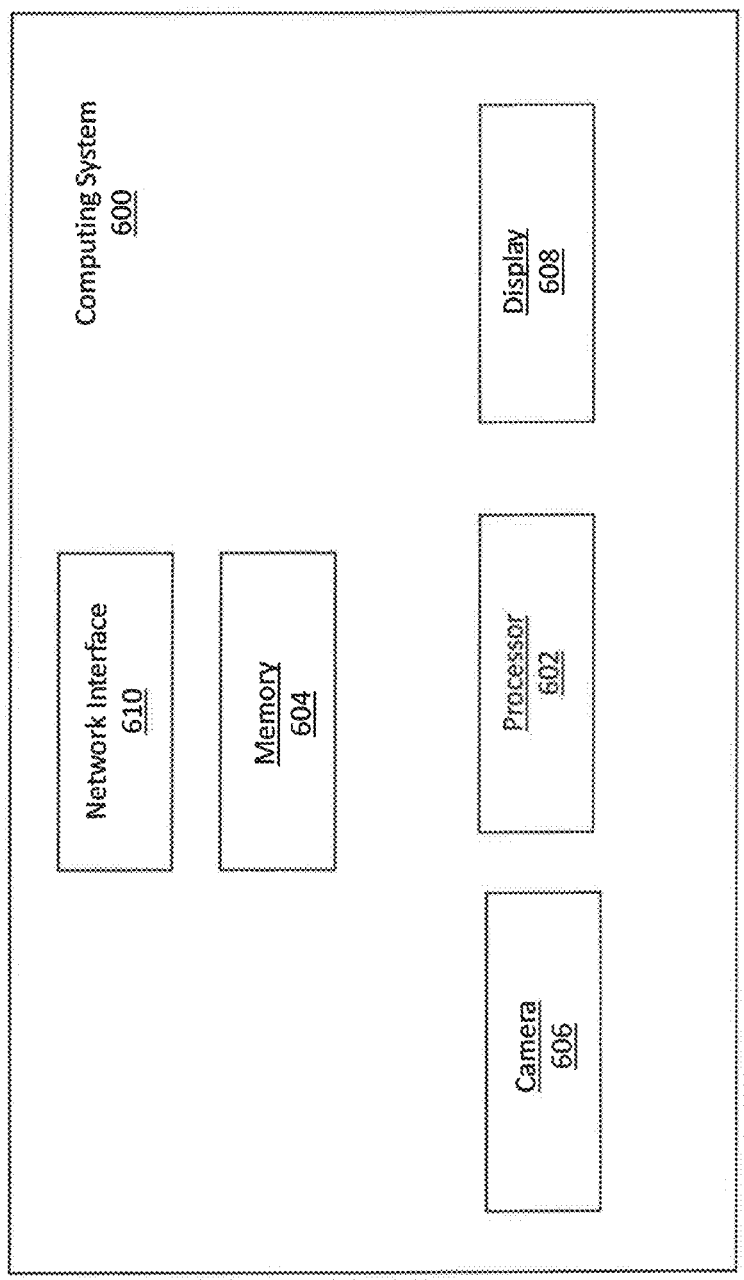
FIG. 6 is a simplified schematic block diagram of an example computing system in which illustrative examples may be implemented for hybrid visual searches and augmented reality, in accordance with one or more examples of the present disclosure.

FIG. 6 illustrates a simplified block diagram of an example computing system in which the illustrative examples for providing hybrid visual searches and augmented may be implemented. The computing system 600 may include hardware components such as a camera 606, a processor 602, a display 608, a network interface 610, and a memory 604. To implement augmented reality, the camera 606 is used to capture an image of a physical object (e.g., a product displayed at a physical store), an image of another image of a physical object (e.g., an image displayed in a catalogue in print or on-line). The camera 606 may transmit the captured image data to the processor 602 for processing and rendering. Alternatively, the computing system 600 may also be configured to obtain an image of a physical object without using the camera 606. For instance, the computing system 600 may be configured to download or otherwise transfer an image of a physical object from sources such as a e-catalogue web site, an image attachment in an email message or a SMS message, an image posted on a social media portal, an image stored in an external data drive (e.g., a USB drive, a cloud service), an image of a stream of images or video feed, and so on.

The processor 602 is configured to process the image data to extract features from the image data. In some examples, the processor 602 is configured to transmit the image to a server for feature extraction and visual search. In other examples, the processor 602 is configured to transmit the extracted features to a server, which in turn performs visual searches based on the transmitted extracted feature. In some examples, the computing system 600 is configured to perform visual searches via the processor 602 independent from backend servers or databases. For instance, the computing system 600 (via the processor 602) and/or a server may execute any suitable techniques such as classification mechanisms, machine learning mechanisms, artificial intelligence enhanced mechanisms to identify particular object (s) in the image. Upon identifying the one or more objects in the image, the processor 602 and/or the server is configured to further retrieve an identifier uniquely identifying the one or more objects. For example, standardized codes such as SKU, GTIN (global trade product number), UPC (universal product code), EAN (International article number), and the like, can be employed as the unique identifier corresponding the one or more objects. In some instances, for one object in the image, the visual search returns a plurality of identifiers that represent a plurality of potential matches.

The processor 602 is also configured to use an identifier returned from the above-described visual search to generate, modify, and/or retrieve augmented content (e.g., 3D model). For example, the processor 602 and/or the server may be configured to retrieve augmented content corresponding to a SKU from a database. In the scenario where the server is tasked to search for database entries corresponding to the SKU of interest, the retrieved augmented content is in turn transmitted back to the processor 602 via the network interface 610. The augmented content may include any data relevant to the search/shopping experience of the user at the computing system 600. In one example, augmented content may include a 3D model of a product that is identified uniquely by the SKU returned by the visual search. In another example, augmented content may include data such as text of description, one or more interactive graphical user interface elements for user's interaction with and/or manipulation of the augmented content in comparison with the searched-for visual object (e.g., for size/dimension estimation), and/or in the context of one or more other physical objects (e.g., for a virtual trial).

The processor 602 may be configured to overlay the augmented content onto the image data. In one example, the augmented content is overlaid at a location proximate to the searched-for object in the image. Based on the camera and sensor calibration information, the augmented content (e.g., the 3D model of the potentially matching product) is scaled using the right ratio mapping the rea-world physical dimensions to the imaging representations. In another example, interactive GUI elements are overlaid in relation to the 3D model such that the user may, for example, translate and/or rotate the 3D model to further analysis in comparison with the searched-for product.

Once the image data is augmented with the augmented content, the processor 602 is configured to transmit the augmented image to the display 608. In turn, the display 608 displays the augmented image to the user. In some examples, the display 608 may allow user interaction with the augmented image, such as zooming, rotating, translating, and the like. In implementations, user input elements such as touchscreen elements, gesture recognizing elements, voice command elements may enable user interaction with the augmented image.

It should be appreciated that the various methods disclosed herein can be implemented by hardware, software, firmware, or a combination thereof. It should further be appreciated that the one or more illustrative components in FIG. 6 may include other components, sub-components, modules, sub-modules, and device commonly found in communication/computing system, which are not discussed herein above for clarity and simplicity of description. Additionally, one or more illustrative components can form a portion of other components and/or one or more illustrative components can be independent from one another.

While one or more examples have been described, it is understood that these examples are illustrative only, and not restrictive, and that many modifications may become apparent to those of ordinary skill in the art, including that various examples of the inventive methodologies, the inventive systems/platforms, and the inventive devices described herein can be utilized in any combination with each other. Further still, the various steps may be carried out in any desired order, any desired steps may be added, and/or any desired steps may be eliminated.

What is claimed is:

1. A non-transitory, computer-readable media having stored thereon instructions, the instructions, when executing by a display generating device, causing the display generating device to perform steps comprising:

capturing an image of an object of interest;

providing at least a portion of the image of the object of interest to a search processing system to allow the search processing system to locate data for use in creating a computer-generated model of a product determined by the search processing system to be a match for the object of interest;

receiving from the search processing system the data;

using the data to create the computer-generated model of the product determined by the search processing system to be a match for the object of interest;

causing the computer-generated model of the product to be displayed in a display associated with the display generating device whereby the computer-generated model of the product can be accurately compared with the object of interest.

2. The non-transitory, computer-readable media method as recited in claim 1, wherein the computer-generated model of the product comprises a three-dimensional image that is capable of being repositioned and reoriented when displayed in the display associated with the display generating device.

3. The non-transitory, computer-readable media method as recited in claim 1, wherein the captured image of the object of interest is displayed in the display with the computer-generated model.

4. The non-transitory, computer-readable media method as recited in claim 1, wherein the display generating device comprises a smart phone or tablet computing device.

5. The non-transitory, computer-readable media method as recited in claim 1, wherein the instructions, when executing by the display generating device, cause the display generating device to pre-process the at least the portion of the image of the object of interest prior to providing the at least the portion of the image of the object of interest to the search processing system.

6. The non-transitory, computer-readable media method as recited in claim 1, wherein the instructions, when executing by the display generating device, cause the display generating device to use information associated with a capturing of the image of the object of interest to scale the computer-generated model of the product to the object of interest so that the computer-generated model of the product can be accurately compared with the object of interest.

7. A non-transitory, computer-readable media having stored thereon instructions, the instructions, when executing by a display generating device, causing the display generating device to perform steps comprising:

capturing an image of an object of interest;

providing at least a portion of the image of the object of interest to a search processing system to allow the search processing system to locate data for use in creating a computer-generated model of a product determined by the search processing system to be a match for the object of interest;

receiving from the search processing system the data;

using the data to create the computer-generated model of the product determined by the search processing system to be a match for the object of interest;

causing the computer-generated model of the product to be projected onto a surface whereby the computer-generated model of the product can be accurately compared with the object of interest.

8. The non-transitory, computer-readable media method as recited in claim 7, wherein the computer-generated model of the product comprises a three-dimensional image that is capable of being repositioned and reoriented when projected onto the surface.

9. The non-transitory, computer-readable media method as recited in claim 7, wherein the display generating device comprises a smart phone or tablet computing device.

10. The non-transitory, computer-readable media method as recited in claim 7, wherein the instructions, when executing by the display generating device, cause the display generating device to pre-process the at least the portion of the image of the object of interest prior to providing the at least the portion of the image of the object of interest to the search processing system.

11. The non-transitory, computer-readable media method as recited in claim 7, wherein the instructions, when executing by the display generating device, cause the display generating device to use information associated with projecting the model of the product onto the surface to scale the computer-generated model of the product to the object of interest so that the computer-generated model of the product can be accurately compared with the object of interest.

* * * * *